United States Patent
Nalla et al.

(10) Patent No.: US 11,606,281 B2
(45) Date of Patent: Mar. 14, 2023

(54) REAL-TIME DIGITAL DATA DEGRADATION DETECTION

(71) Applicant: Schweitzer Engineering Laboratories, Inc., Pullman, WA (US)

(72) Inventors: Bharat Nalla, Pullman, WA (US); Nishchal Sharma, Pullman, WA (US); Arun Shrestha, Charlotte, NC (US); Ozan Akyildiz, Pullman, WA (US); Mauricio G. Silveira, Pullman, WA (US); Manodev J. Rajasekaran, Pullman, WA (US); Sajal Harmukh, Pullman, WA (US); Jaya R A K Yellajosula, Houston, TX (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/325,458

(22) Filed: May 20, 2021

(65) Prior Publication Data
US 2022/0377003 A1    Nov. 24, 2022

(51) Int. Cl.
*H04L 43/16* (2022.01)
*H04L 43/0823* (2022.01)
(Continued)

(52) U.S. Cl.
CPC .......... *H04L 43/16* (2013.01); *H04L 43/0829* (2013.01); *H04L 43/0847* (2013.01); *H04L 43/0852* (2013.01)

(58) Field of Classification Search
CPC ...... G01R 31/085; G01R 13/00; G01R 19/00; G01R 19/2513; G01R 21/133;
(Continued)

(56) References Cited

U.S. PATENT DOCUMENTS

| 2,817,024 A | 12/1957 | Karlicek |
| 7,230,809 B2 | 6/2007 | Whitehead |

(Continued)

FOREIGN PATENT DOCUMENTS

| WO | WO-2019174889 A1 * | 9/2019 | ............ G08C 17/02 |
| WO | WO-2022066199 A1 * | 3/2022 | |

OTHER PUBLICATIONS

Kazmi et al., "Power Management and Control System—Insights Into Design and Testing", Presented at Saudi Arabia Smart Grid 2018, Dec. 11-13, 2018 (Year: 2018).*

(Continued)

*Primary Examiner* — Imad Hussain
*Assistant Examiner* — Sandarva Khanal
(74) *Attorney, Agent, or Firm* — Jared L. Cherry

(57) ABSTRACT

Systems and methods are disclosed to monitor real-time digital data for degradation. In one embodiment, an intelligent electronic device ("IED") in an electric power system may include an interface to receive a stream of digital data, the stream of digital data comprising a plurality of data frames. A protective action subsystem may monitor the sampled digital data and implement a protective action based on the stream of sampled digital data. A digital data degradation detection subsystem may analyze a plurality of digital metrics associated with the plurality of data frames and make a determination regarding degradation of a communication channel based on whether the plurality of digital metrics fails at least one threshold. In response to the determination, the digital data degradation detection subsystem may implement a response to the determination that the plurality of digital metrics fails at least one threshold.

14 Claims, 6 Drawing Sheets

(51) Int. Cl.
*H04L 43/0829* (2022.01)
*H04L 43/0852* (2022.01)

(58) Field of Classification Search
CPC ....... G01R 22/10; G01R 19/145; G06F 17/40; G06F 19/00; H02H 1/0007; H02H 7/263; H04L 1/20; H04L 41/0631; H04L 43/0811; H04L 43/0829; H04L 43/16; H04L 45/22; H04L 1/201; H04L 41/0645; H04L 43/0847; H04L 43/0852
See application file for complete search history.

(56) References Cited

U.S. PATENT DOCUMENTS

| | | | |
|---|---|---|---|
| 7,630,863 B2 | 12/2009 | Zweigle | |
| 8,024,639 B2 | 9/2011 | Cooper | |
| 8,024,494 B2 | 10/2011 | Soeda | |
| 8,560,255 B2 | 10/2013 | Elwarry | |
| 10,205,647 B2 | 2/2019 | Yang | |
| 10,379,991 B2 | 8/2019 | Yang | |
| 10,541,944 B1* | 1/2020 | Nelson | H04L 43/0847 |
| 10,797,985 B2 | 10/2020 | Yang | |
| 10,859,611 B2 | 12/2020 | Yang | |
| 11,112,466 B2 | 9/2021 | Schweitzer | |
| 2003/0048508 A1 | 3/2003 | Yu | |
| 2004/0090312 A1* | 5/2004 | Manis | H04B 3/542 370/464 |
| 2004/0147289 A1* | 7/2004 | Paljug | H04B 7/0814 455/562.1 |
| 2004/0170128 A1 | 9/2004 | Takamichi | |
| 2005/0280966 A1 | 12/2005 | Whitehead | |
| 2006/0013046 A1* | 1/2006 | Kim | G01R 31/31703 365/189.05 |
| 2007/0230427 A1* | 10/2007 | Arseneault | H04W 28/24 370/340 |
| 2009/0012728 A1 | 1/2009 | Spanier | |
| 2009/0064248 A1* | 3/2009 | Kwan | H04L 49/555 725/109 |
| 2009/0154281 A1 | 6/2009 | Lee | |
| 2009/0296583 A1 | 12/2009 | Dolezilek | |
| 2010/0004761 A1* | 1/2010 | Flanders | G05B 9/03 700/28 |
| 2010/0020724 A1 | 1/2010 | Wimmer | |
| 2010/0040068 A1 | 2/2010 | Wimmer | |
| 2010/0165849 A1* | 7/2010 | Eisenberg | H04L 43/0811 370/242 |
| 2010/0183298 A1 | 7/2010 | Biegert | |
| 2011/0003570 A1 | 1/2011 | Yu | |
| 2011/0029687 A1 | 2/2011 | Kirrmann | |
| 2011/0047264 A1 | 2/2011 | Hilpert | |
| 2011/0112699 A1 | 5/2011 | Tournier | |
| 2011/0196627 A1 | 8/2011 | Steinhauser | |
| 2012/0134061 A1* | 5/2012 | Kasztenny | H02H 1/0061 361/64 |
| 2012/0233296 A1 | 9/2012 | Wimmer | |
| 2012/0294177 A1 | 11/2012 | Yan | |
| 2013/0031664 A1 | 1/2013 | Sundaram | |
| 2013/0096854 A1 | 4/2013 | Schweitzer | |
| 2013/0215771 A1 | 8/2013 | Obrist | |
| 2013/0235747 A1 | 9/2013 | Le | |
| 2013/0250458 A1* | 9/2013 | Finney | H02H 3/05 702/58 |
| 2014/0104738 A1* | 4/2014 | Schweitzer, III | H02H 3/08 361/87 |
| 2014/0253146 A1 | 9/2014 | Kesler | |
| 2014/0307353 A1* | 10/2014 | Ferri | H02H 3/338 361/50 |
| 2015/0316593 A1* | 11/2015 | Oda | G01R 21/133 702/60 |
| 2015/0327001 A1* | 11/2015 | Kirshenberg | H04W 4/80 455/41.2 |
| 2016/0013632 A1 | 1/2016 | Lloyd | |
| 2016/0197800 A1 | 7/2016 | Hui | |
| 2016/0334468 A1 | 11/2016 | Patel | |
| 2017/0026291 A1 | 1/2017 | Smith | |
| 2017/0026292 A1* | 1/2017 | Smith | H04L 43/0829 |
| 2017/0048113 A1 | 2/2017 | Wang | |
| 2017/0070919 A1* | 3/2017 | Verger | H04L 67/148 |
| 2017/0288950 A1* | 10/2017 | Manson | H04L 43/0817 |
| 2018/0034689 A1 | 2/2018 | Kanabar | |
| 2018/0089057 A1 | 3/2018 | Yang | |
| 2019/0094290 A1* | 3/2019 | Schweitzer, III | G01R 31/11 |
| 2020/0112162 A1* | 4/2020 | Rajasekaran | G01R 19/2513 |
| 2021/0022021 A1* | 1/2021 | Bag | H04W 52/241 |
| 2021/0103006 A1* | 4/2021 | Menzel | G01R 31/56 |
| 2021/0184461 A1* | 6/2021 | Bickel | G01R 21/1331 |

OTHER PUBLICATIONS

Janne Starck, Antti Hakala-Ranta, Martin Stefanka, Switchgear Optimization Using IEC 61850-9-2 and Non-Conventional Measurements May 23, 2012.

Heiko Englert, Henry Dawidczak, IEC 61850 Substation to Control Center Communication—Status and Practical Experiences from Projects, 2009 IEEE Bucharest Power Tech Conference, Jun. 28, 2009.

Rene Midence, Dominic Iadonisi, Ethernet Networks Redundancy with Focus on IEC 61850 Applications, 20th International Conference on Electricity Distribution, Jun. 8-11, 2009.

* cited by examiner

REAL-TIME DIGITAL DATA DEGRADATION DETECTION

TECHNICAL FIELD

This present disclosure pertains to systems and methods for real-time sampled digital data degradation detection. More particularly, but not exclusively, the systems and methods disclosed herein may be used in systems to monitor and control electric power systems.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
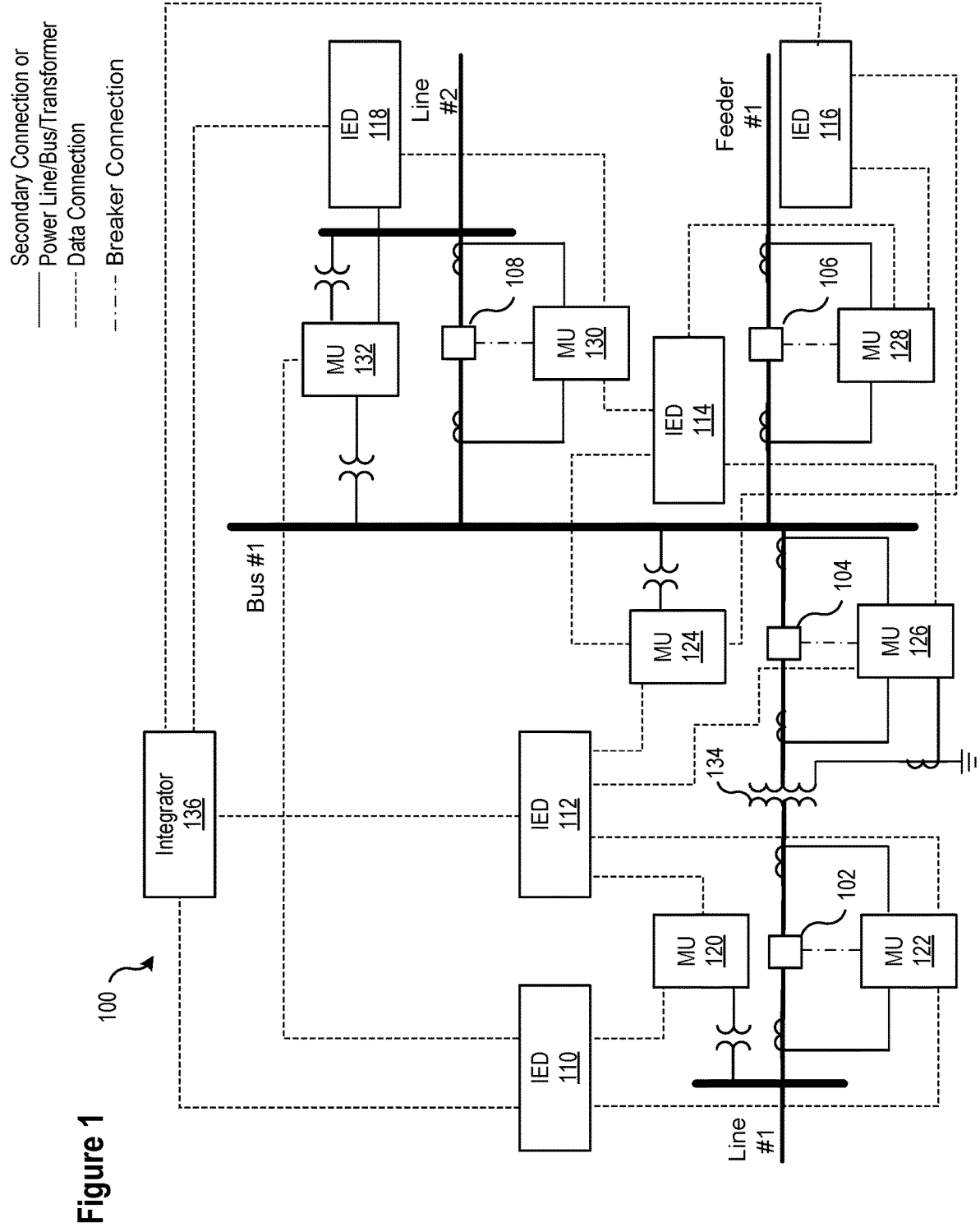
FIG. 1 illustrates a block diagram of a portion of an electric power system consistent with embodiments of the present disclosure.

Modern electric power systems are complex and utilize equally complex communication systems to monitor, automate, and protect the electric power systems. These systems are expected to operate reliably under widely variable conditions (e.g., high and low temperatures, high and low humidity, etc.). Further, such systems are expected to operate for extended periods (e.g., 10 or more years) with little to no maintenance. Interruptions of communications associated with the monitoring, automation, and protection systems associated with an electric power system can reduce reliability and result in electrical outages.

The inventors of the present disclosure have recognized that advantages may be realized by implementing real-time monitoring of digital communication channels consistent with embodiments of the present disclosure. Such monitoring may help to identify potential issues before such issues result in a disruption of the communication channels and help identify potential hardware failures, isolate the problem equipment and help in faster restoration of service. Further, the systems and methods of the present disclosure may be used to adapt to degraded communication channels using various techniques (e.g., restraining protective actions, rerouting traffic around degraded communication channels, etc.).

Some embodiments consistent with the present disclosure may be implemented in electric power systems using an intelligent electronic device ("IED"). As used herein, an IED may refer to any microprocessor-based device that monitors, controls, automates, and/or protects monitored equipment within a system. Such devices may include, for example, differential relays, distance relays, directional relays, feeder relays, overcurrent relays, voltage regulator controls, voltage relays, breaker failure relays, generator relays, motor relays, remote terminal units, automation controllers, bay controllers, meters, recloser controls, communication processors, computing platforms, programmable logic controllers (PLCs), programmable automation controllers, input and output modules, and the like. The term IED may be used to describe an individual IED or a system comprising multiple IEDs. Further, IEDs may include sensors (e.g., voltage transformers, current transformers, contact sensors, status sensors, light sensors, tension sensors, etc.) that provide information about the electric power system.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer-executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. A module or component may comprise a single instruction or many instructions and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. In some embodiments, the computer or another electronic device may include a processing device such as a microprocessor, microcontroller, logic circuitry, or the like. The processing device may further include one or more special-purpose processing devices such as an application-specific integrated circuit (ASIC), programmable array logic (PAL), a programmable logic array (PLA), a programmable logic device (PLD), field-programmable gate array (FPGA), or any other customizable or programmable device.

FIG. 1 illustrates a block diagram of a portion of an electric power system 100 consistent with embodiments of the present disclosure. Electric power system 100 may represent equipment commonly found in a substation of an electric power system. Power may be supplied by Line #1 and Line #2. Bus #1 connects Line #1 and Line #2 and Feeder #1, which may provide power to electrical loads. A transformer 134 may change the voltage between Line #1 and Bus #1. For example, Line #1 may connect to a high-voltage transmission line, and transformer 134 may step down the voltage to a level suitable for distribution. A plurality of breakers 102, 104, 106, and 108 may selectively interrupt electrical current. Breaker 102 may disconnect electric power system 100 from Line #1. Breakers 102 and 104 may electrically isolate transformer 134. Breaker 108 may disconnect electric power system 100 from Line #2. Breaker 106 may disconnect Feeder #1, thereby cutting off power to loads served by Feeder #1.

Electric power system 100 includes IEDs 110, 112, 114, 116, and 118 that monitor, automate, and protect electric power system 100. Various IEDs may receive analog and binary inputs from a digital secondary system (DSS). DSS technology uses remote data acquisition devices to measure currents and voltages and perform substation control operations. This technology provides flexible solutions, reduces the cost of installing cabling, and improves overall safety in the substation. DSS technology may use various communication protocols, such as the Time-Domain Link ("TiDL") Protocol ("T-Protocol"), IEC61850-9-2 Sampled Values ("SV"), and other proprietary or open source protocols.

A plurality of merging units 120, 122, 124, 126, 128, 130, and 132 may sample voltages and/or currents at various locations in electric power system 100 and transmit streams of digitized values to the IEDs 110, 112, 114, 116, and 118. Merging units 120, 122, 124, 126, 128, 130, and 132 may also receive digital signals from other devices. In various embodiments, merging units (MUs) 120, 122, 124, 126, 128, 130, and 132 may communicate with the plurality of IEDs 110, 112, 114, 116, and 118 using T-Protocol. T-Protocol is a non-Ethernet and non-routable, which precludes interactive remote user access to minimize security complexity and the associated costs.

IEDs 110, 112, 114, 116, and 118 may be configured to perform specific tasks based on the equipment to which each IED is connected. For example, IED 112 may be embodied as a transformer protection relay, such as a transformer protection relay available from Schweitzer Engineering Laboratories ("SEL") of Pullman, Wash. IED 112 may receive voltage measurements from merging units 120 and 124 and may receive current measurements from merging units 122 and 126. These current and voltage measurements may allow IED 112 to monitor and protect transformer 134 from a variety of conditions that could cause damage. Similarly, IED 114 may be embodied as the bus differential and breaker failure relay from SEL. IED 114 may receive voltage and current measurements from each of merging units 124, 126, 128, and 130.

Each merging unit in electric power system 100 is connected to multiple IEDs, and the IEDs use the measurements made by the merging units to monitor and protect the electric power system equipment in electric power system 100. Operation of electric power system 100 relies on communication among various elements, and undesired operation may occur if communication is disrupted or rerouted. For example, if the connections between merging units 120 and 124 are switched, IED 112 may drop packets to prevent implementation of a protective action (e.g., actuating breakers 102 and 104).

An integrator 136 may be in communication with IEDs 110, 112, 114, 116, and 118, and may provide backup protection, communication protection, and other functions. If any of the communication links between an IED 110, 112, 114, 116, and 118 and a merging unit is lost, integrator 136 may provide backup protection using information routed through other communication links. For example, if the communication link between MU 120 and IED 112 fails, but the communication link between MU 120 and IED 110 remains active, the information from MU 120 may be routed by IED 110 to integrator 136. Further information from the other MUs that provide information to IED 112 (i.e., MU 122, 124, and 126) may also be routed to integrator 136. Using this information, integrator 136 may continue to protect transformer 134 despite the failure of the communication link between IED 112 and MU 120. Additional information regarding the backup protection functions that may be performed by integrator 136 is provided in U.S. patent application Ser. No. 16/796,563, titled Equipment Failure Detection in an Electric Power System, and which is incorporated herein by reference.

Electric power system 100 relies on the plurality of data connections between the IEDs and the MUs. If the data connections between devices degrade, the flow of information about the operation of electric power system 100 is impeded, and the protection, automation, and monitoring functions may be inhibited. Monitoring real-time characteristics of communications may provide early warnings of potential problems and reroute communications until problems are resolved.

Figure 2:
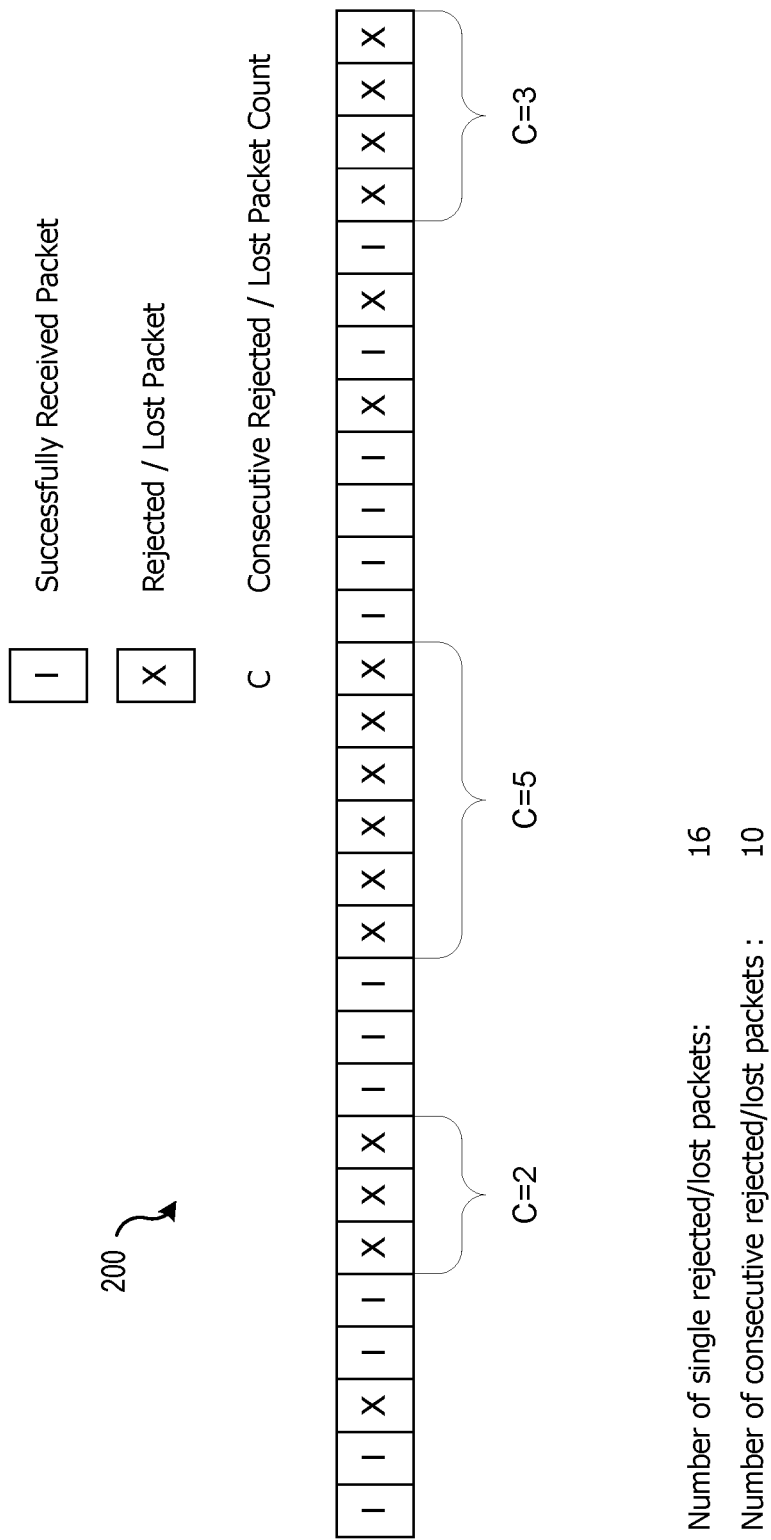
FIG. 2 illustrates a conceptual representation of a stream of data packets that are either successfully received or rejected/lost by a receiving device, along with a count of consecutively rejected/lost packets consistent with embodiments of the present disclosure.

FIG. 2 illustrates a conceptual representation of a stream of data packets 200 that are either successfully received or rejected/lost by a receiving device, along with a count of consecutively rejected/lost packets consistent with embodiments of the present disclosure. The stream of data packets 200 may be generated by any type of device communicating on any type of data network. In one specific embodiment, the stream of data packets 200 may be generated by a merging unit operating in an electric power system, and the receiving device may be an IED that determines the count of consecutively rejected/lost packets.

While some packet rejection/loss may be expected, the rejection/loss of a threshold number of consecutive packets may indicate degradation in the communication channel. Packets may be rejected based on a variety of parameters monitored by a receiving system. For example, packets may be rejected if the data in a packet does not match an expected value or if the data is corrupted.

A receiving device consistent with the present disclosure may maintain a count of rejected/lost data packets. The stream of data packets 200 includes three sets of consecutive rejected/lost packets. The first set includes three rejected/lost packets in succession, and the receiving device may set a consecutive count value, C, equal to 2. The count of C may begin after a first packet is rejected or lost. The second set includes six rejected/lost packets, and the receiving device may set the consecutive count value equal to 5. The final set includes four rejected/lost packets, and the receiving device may set the consecutive count value equal to 3.

Figure 3:
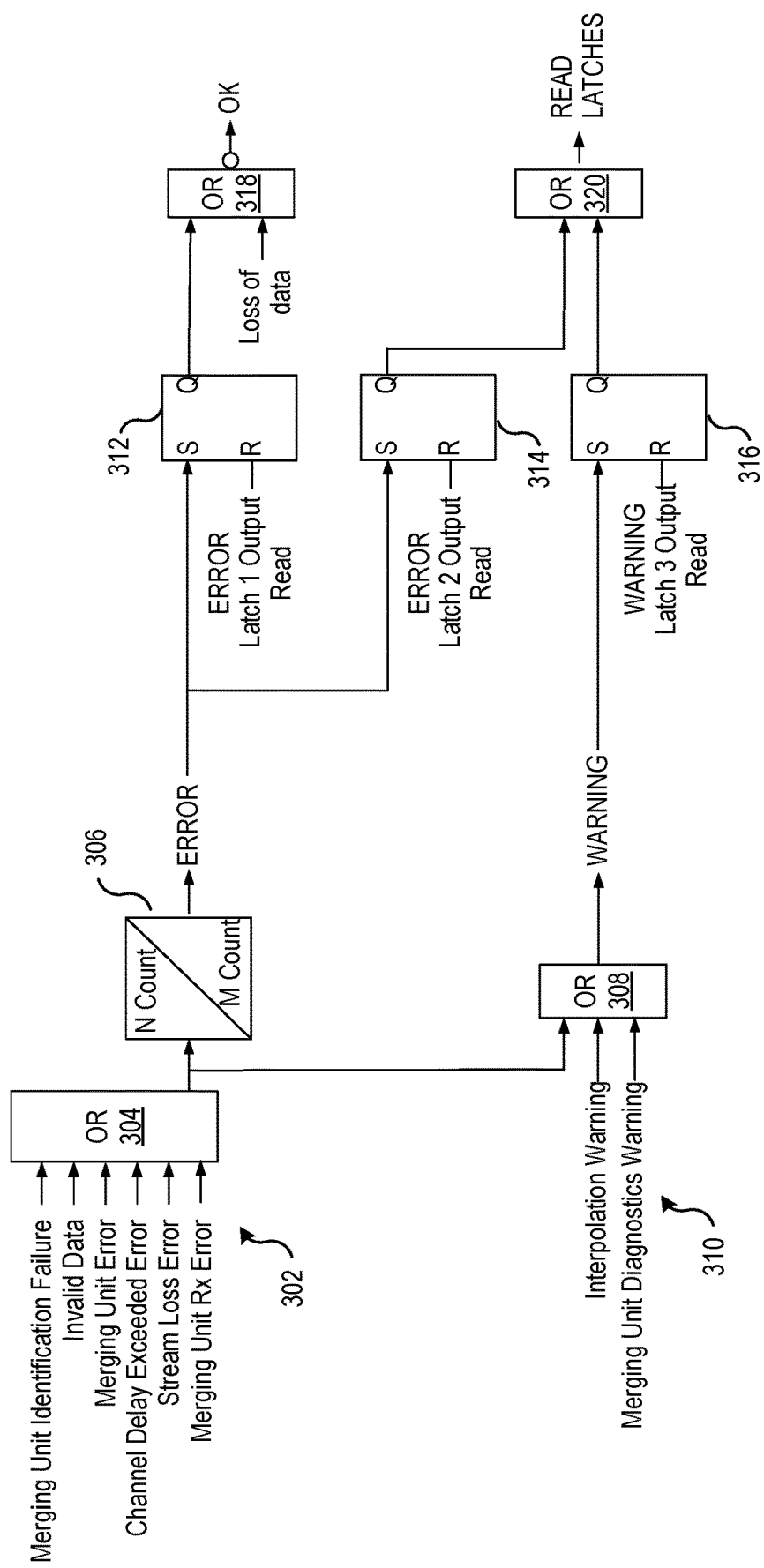
FIG. 3 illustrates a block diagram of a system to monitor real-time sampled digital data received from a merging unit for degradation in embodiments consistent with the present disclosure.

FIG. 3 illustrates a block diagram of a system 300 to monitor real-time sampled digital data received from a merging unit for degradation in embodiments consistent with the present disclosure. A plurality of inputs 302 may be received and related to a stream of digital data received by a particular port. Receiving devices that receive communications through multiple communication channels may include a monitoring system for each such channel. The plurality of inputs 302 is briefly described below.

A merging unit identification failure error may be triggered when a received packet is not properly identified. For example, transmitting devices may include a unique identifier that may be used by a receiving device to identify the transmitting device. If the identifier does not match, or if another parameter used to identify the transmitting device (e.g., MAC address, communication protocol, etc.) does not match an expected value, the merging unit identification failure signal may be asserted.

A merging unit error flag may be asserted by a merging unit upon detection of an error condition. One example of such criteria is explained below in connection with the inputs to OR gate 404 illustrated in FIG. 4.

An invalid data error may be triggered based on an analysis of the data received. For example, the invalid data error may be triggered by receipt of a corrupted data packet. Data corruption may be detected using a cyclical redundancy check (CRC) or other technique. Further, an invalid data error may be triggered if a received frame is longer than expected. The frame length may depend on the amount of information included in a packet (e.g., the number of sampled analog values, other analog values, binary inputs, binary outputs, other binary values, etc.). The invalid data error, may also be triggered if a when a frame is not received according to an expected schedule.

A merging unit error may be triggered based on flag set by a TMU. The merging unit error may indicate a problem with TMU that does not match the criteria associated with the other signals.

A channel delay exceeded error may be triggered when the delay associated with a particular packet exceeds a threshold. In some embodiments, the delay may be determined based on the sample time in a received packet.

A stream loss error may be generated when a threshold number of frames (e.g., 8 framed) are lost.

A merging unit receive (RX) error may be triggered based on a RX error flag set by a merging unit within a received frame.

Inputs 302 may be provided to an OR gate 304, and the output of OR gate 304 may be asserted if one or more of the inputs is asserted. In various embodiments, more, fewer, or different inputs may be used to monitor real-time sampled digital data for degradation. For example, in some embodiments, a subset of the inputs shown in FIG. 3 may be used. In one specific example, three of the inputs may be used to detect data degradation. The inputs may be selected based on a particular application. For example, in an application sensitive to latency, the channel delay exceeded error may be selected to ensure that channel latency remains within acceptable parameters.

The output of OR gate 304 may be an input to counter 306. Counter 306 may maintain a count of consecutive packets in which one or more error conditions are indicated by inputs 302. In the specifically illustrated embodiment, counter 306 asserts its output after N packets are associated with one or more error conditions indicated by inputs 302. The output of counter 306 generates an ERROR signal. Counter 306 may reset if M packets are successfully received. In various embodiments, the thresholds monitored by counter 306 (i.e., the number of packets associated with an error condition indicated by inputs 302 or the number of successfully received packets) may be adjusted.

The output of OR gate 304 may also be an input to OR gate 308, which also receives other inputs 310. The inputs 310 are briefly described below.

An interpolation warning may be generated when two non-adjacent samples are used to generate an interpolated sample.

A TMU diagnostics warning may be asserted based on various transient hardware problems.

The output of OR gate 308 may generate a WARNING signal.

The ERROR signal generated by counter 306 may provide an input to latches 312 and 314. Latches 312, 314, and 316 may maintain the error signals for a sufficient amount to time to allow a microcontroller to read the signals or to store the signal in non-volatile memory. In the illustrated embodiments, latches 312 and 314 are set-reset latches, but other devices may implement similar functions. Latches 312 and 314 may assert their outputs when the ERROR signal is asserted and maintain their outputs (Q) until a reset command is issued based on the ERROR Latch 1 Output Read signal and the ERROR Latch 2 Output Read signal, respectively. The reset command may be asserted by a receiving device to clear an error condition.

The output of latch 312 may be provided to OR gate 318, which also receives a signal associated with a loss of data signal. The loss of data signal may be asserted if the ERROR signal is missing for three or more consecutive samples. The inverted output of OR gate 318 may generate an OK signal. The OK signal may be asserted when the conditions to trigger the ERROR signal and the loss of data signal are not met. The OK signal may be relied upon by a receiving device to utilize the information received from a particular port associated with system 300.

The outputs of latches 314 and 316 may be provided to OR gate 320. OR Gate 320 generates a READ LATCHES signal if the output of either latch 314 or latch 316 is asserted. The WARNING and ERROR signals may cause a receiving device to assert a read signal associated with each latch. The assertion of the read signals, which may reset the latches 312, 314, and 316 if the ERROR and WARNING signals are asserted, ensures that the receiving device receives and acts on the ERROR and WARNING signals.

The OK output may be updated at a fixed rate based on the frequency of an electric power system. In one example in which system 300 is embodied in an IED in an electric power system, the OK output may be updated once every ⅛ power system cycle (i.e., 480 times per second in a 60 Hz electric power system).

A receiving signal may implement an action based on the OK signal. Such actions may include freezing signal values, restraining protective actions, rerouting traffic around degraded communication channels, etc. Actions implemented in response to a change in the OK signal may be selected based on the specific application in which system 300 is operating.

Figure 4:
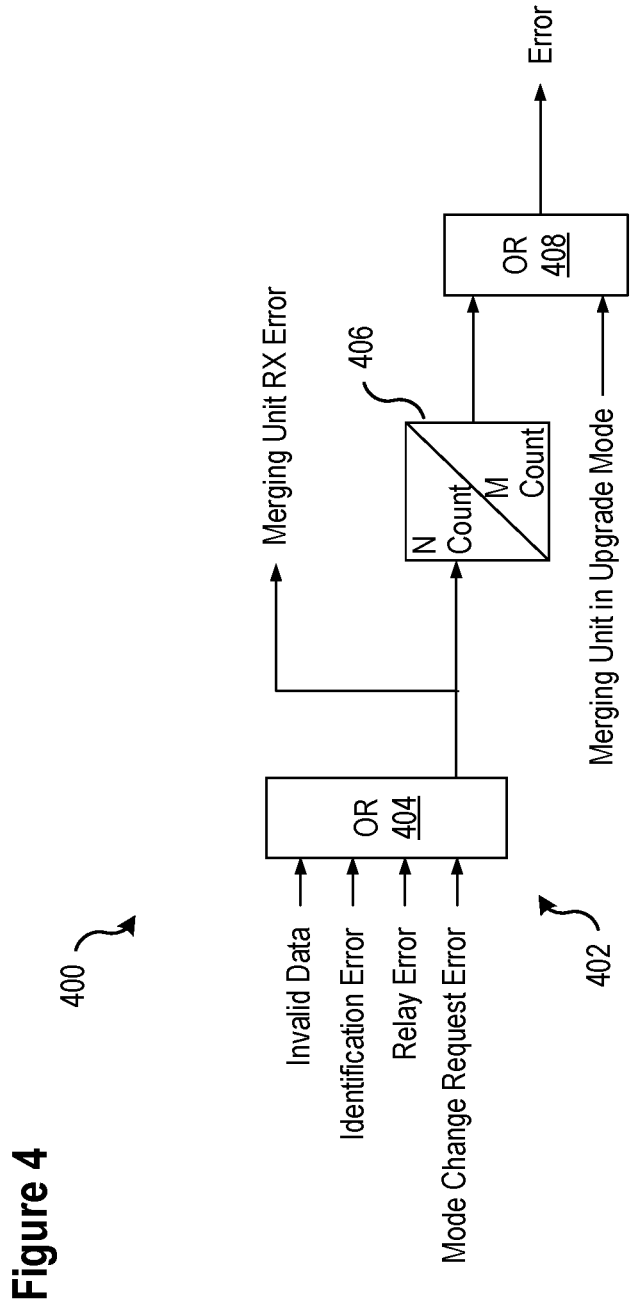
FIG. 4 illustrates a block diagram of a system to monitor real-time sampled digital data received from an intelligent electronid device ("IED") for degradation in embodiments consistent with the present disclosure.

FIG. 4 illustrates a block diagram of a system 400 to monitor real-time sampled digital data received from a relay for degradation in embodiments consistent with the present disclosure. System 400 may identify inconsistencies and errors associated with received frames. Upon detection of an anomaly, system 400 may implement an appropriate action (e.g., discarding a frame, rerouting communications, restraining an action). In some embodiments, system 400 may also communicate channel degradation to one or more relays, which in turn may implement appropriate actions. System 400 may operate within a MU that receives control signals from a relay. The control signals may be included in a stream of data frames.

A plurality of inputs 402 may be received and related to a stream of digital data from a relay received by a particular port. In some embodiments, each port may include a distinct monitoring system. The plurality of inputs 402 is briefly described below.

An invalid data error may be triggered based on an analysis of the data received. For example, the invalid data error may be triggered by receipt of a corrupted data packet. Data corruption may be detected using a cyclical redundancy check (CRC) or other technique. Further, an invalid data error may be triggered if a received frame is longer than expected. The frame length may depend on the amount of information included in a packet (e.g., the number of sampled analog values, other analog values, binary inputs, binary outputs, other binary values, etc.). The invalid data error, may also be triggered if a when a frame is not received according to an expected schedule. An identification error may be triggered when a received packet is not properly identified. For example, transmitting devices may include a unique identifier that may be used by a receiving device to identify the transmitting device. If the identifier does not match, or if another parameter used to identify the transmitting device (e.g., MAC address, communication protocol, etc.) does not match an expected value, the merging unit identification failure signal may be asserted.

A relay bit may be generated when the transmitting device sets a error flag to indicate a problem with relay that does not match the criteria associated with the other signals.

A mode change request error may be triggered when an incoming frame does not match the mode of the receiving device. For example, if a received frame includes upgrade instructions, but the receiving device is not in an upgrade mode, a mode change request error may be triggered.

Inputs 402 may be provided to an OR gate 404, and the output of OR gate 404 may be asserted if one or more of the inputs 402 is asserted. In various embodiments, more, fewer, or different inputs may be used to monitor real-time sampled digital data for degradation. The output of OR gate 404 may be used to generate the RX Error signal that is an input to OR gate 304 in FIG. 3.

The output of OR gate 404 may be an input to counter 406. Counter 406 may maintain a count of consecutive frames or packets in which one or more error conditions are indicated by inputs 402. In the specifically illustrated embodiment, counter 406 asserts its output after exceeding a threshold number (N) of packets associated with one or more error conditions indicated by inputs 402. Counter 406 may reset upon successful receipt of a frame or packet.

The output of counter 406 and an upgrade mode signal may be inputs to OR gate 408. If either the output of counter 406 or the upgrade mode signal is asserted, an error signal may be generated. The output of OR gate 408 may be used to implement an appropriate action. In one specific embodiment, assertion of the output of OR gate 408 may cause a merging unit including system 400 to cause some or all the outputs of the merging unit to return to a default state.

Figure 5:
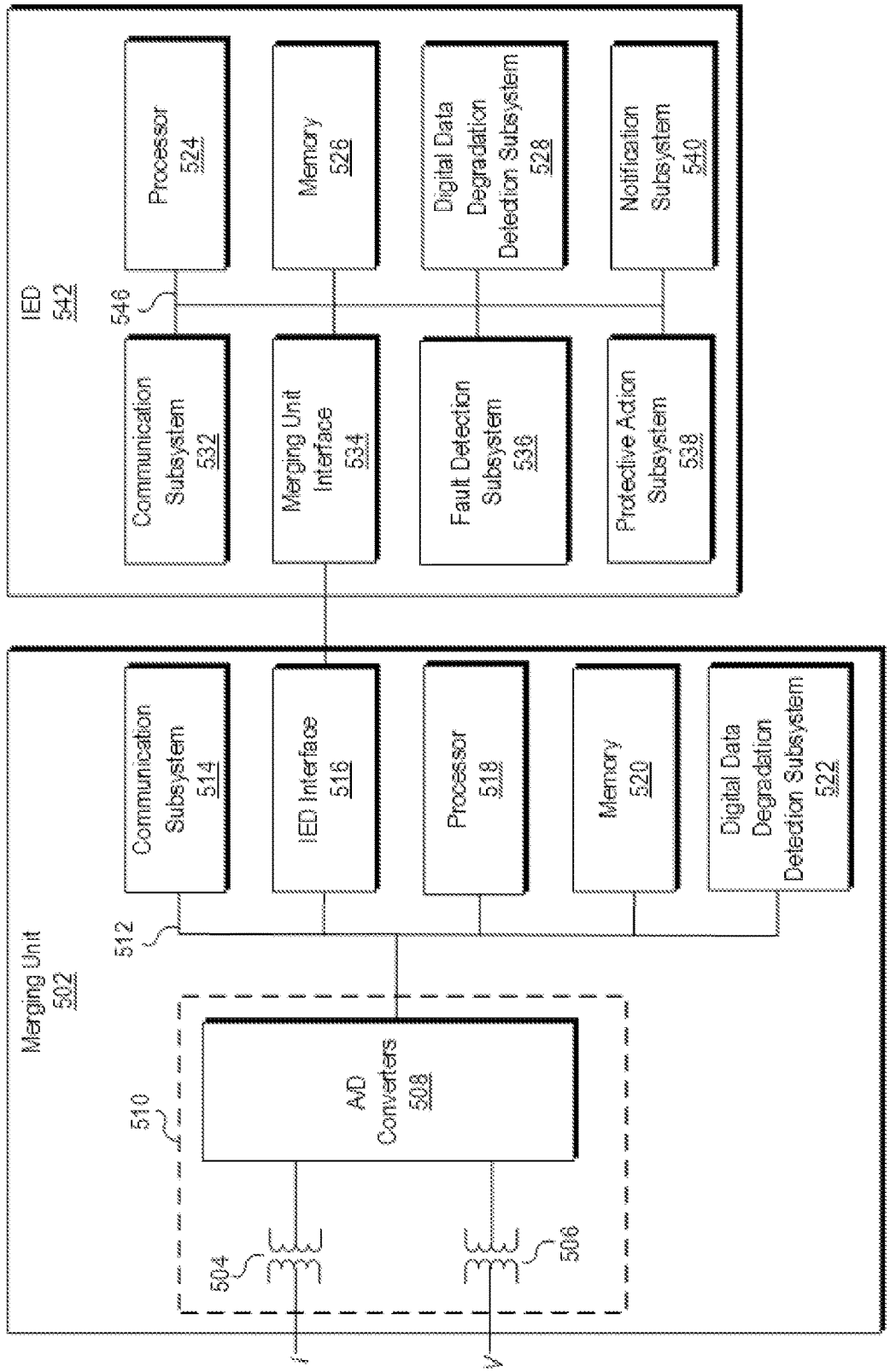
FIG. 5 illustrates a functional block diagram of a system comprising a merging unit and an IED, in which the merging unit and the IED monitor real-time sampled digital data degradation consistent with embodiments of the present disclosure.

FIG. 5 illustrates a functional block diagram of a system 500 comprising a merging unit 502 and an IED 542, in which the merging unit 502 and the IED 542 monitor real-time sampled digital data degradation consistent with embodiments of the present disclosure. In one embodiment, merging unit 502 may be embodied as one of the merging units illustrated in FIG. 1, and IED 542 may be embodied as one of the IEDs illustrated in FIG. 1. System 500 may be implemented using hardware, software, firmware, and/or any combination thereof.

Processor 518 processes communications received via communication subsystem 514, IED interface 516, and the other subsystems and components in merging unit 502. Processor 518 may operate using any number of processing rates and architectures. Processor 518 may perform various algorithms and calculations described herein. Processor 518 may be embodied as a general-purpose integrated circuit, an application-specific integrated circuit, a field-programmable gate array, and/or any other suitable programmable logic device. Processor 518 may communicate with other elements in merging unit 502 by way of data bus 512.

Memory 520 may comprise any of a variety of transitory and non-transitory computer-readable storage media. Memory 520 may comprise executable instructions to perform processes described herein. Memory 520 may comprise machine-readable media such as, but not limited to, hard drives, removable media, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. Such electronic instructions may be executed on processor 518.

Merging unit 502 may acquire analog voltage and current measurements, digitize the measurements, and transmit the measurements in a digital format to IED 542. A sensor subsystem 510 may receive current measurements (I) and/or voltage measurements (V). The sensor subsystem 510 may comprise analog-to-digital ("A/D") converters 508 that sample and/or digitize filtered waveforms to form corresponding digitized current and voltage signals provided to a data bus 512. A current transformer 504 and/or a voltage transformer 506 may include separate signals from each phase of a three-phase electric power system.

Communication subsystem 514 may format communications according to a variety of communication protocols and standards. In one embodiment, communication subsystem 514 may provide a stream of measurements obtained by sensor subsystem 510 in the T-Protocol.

IED interface 516 may allow communication between merging unit 502 and IED 542. IED interface 516 may comprise a plurality of ports configured to communicate with a plurality of merging units although only a single merging unit 502 is shown in FIG. 5. IED interface 516 may be in communication with merging unit interface 534. IED interface 516 and merging unit interface 534 may allow for bidirectional communication. For example, merging unit 502 may communicate a stream of measured values, and IED 542 may communicate protective actions (e.g., actuating a breaker) to be implemented by merging unit 502. Merging unit interface 534 may comprise a plurality of ports configured to communicate with a plurality of merging units although only a single merging unit 502 is shown in FIG. 5.

Digital data degradation detection subsystem 522 may monitor digital communications received from IED 542 for signs of digital signal degradation. In various embodiments, a variety of parameters may be monitored and used to determine whether a digital signal received from IED 542 is degraded. In one specific embodiment, IED interface 516 may implement system 400 shown in FIG. 4.

Merging unit interface 534 may similarly monitor digital communications received from merging unit 502 for signs of digital signal degradation. In various embodiments, a variety of parameters may be monitored and used to determine whether a digital signal received from merging unit 502 is degraded. In one specific embodiment, merging unit interface 534 may implement system 300 shown in FIG. 3.

Processor 524 processes communications received via communication subsystem 532, merging unit interface 534, and the other subsystems and components in IED 542. Processor 524 may operate using any number of processing rates and architectures. Processor 524 may perform various algorithms and calculations described herein. Processor 524 may be embodied as a general-purpose integrated circuit, an application-specific integrated circuit, a field-programmable gate array, and/or any other suitable programmable logic device. Processor 524 may communicate with other elements in IED 542 by way of bus 546.

Memory 526 may comprise any of a variety of transitory and non-transitory computer-readable storage media. Memory 526 may comprise executable instructions to perform processes described herein. Memory 526 may comprise machine-readable media such as, but not limited to, hard drives, removable media, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. Such electronic instructions may be executed on processor 524.

A digital data degradation detection subsystem 528 may monitor metrics associated with digital data received from merging unit 502. In one specific embodiment, digital data degradation detection subsystem 528 may implement the logic implemented by system 300 and described in FIG. 3. Digital data degradation detection subsystem 528 may implement various actions in response to detected degradation of the communication channel. Such actions may include freezing signal values, restraining protective actions, rerouting traffic around degraded communication channels, etc.

Communication subsystem 532 may format communications according to a variety of communication protocols and standards. In one embodiment, communication subsystem 532 may be configured to receive a stream of measurements from merging unit 502 in the T-Protocol. Communication subsystem 532 may also provide the ability for IED 542 to communicate with other devices via a variety of communication media and communication protocols.

A fault detection subsystem 536 may be configured to analyze measurements or information received from merging unit 502 to identify a fault or other type of anomalous condition. Faults may comprise a variety of types of conditions, such as an over-current condition, an over-voltage or under-voltage condition, an over-frequency or under-frequency condition, etc.

Protective action subsystem 538 may implement a protective action based on the identification of a fault by fault detection subsystem 536. In various embodiments, a protective action may include tripping a breaker, selectively isolating or disconnecting a portion of the electric power system, etc. Protective action subsystem 538 may coordinate protective actions with other devices in communication with IED 542. Protective action subsystem 538 may operate in conjunction with digital data degradation detection subsystem 528 to ensure that protective actions are not implemented based on degraded communications.

A notification subsystem 540 may generate a notification alerting a user of a variety of conditions associated with IED 542 and/or merging unit 502. In various embodiments, the notification may comprise an alert sent to an operator of system 500. The alert may take a variety of forms, such as a notification sent to a supervisory system (e.g., a supervisory control and data acquisition ("SCADA") system, a wide-area situational awareness ("WASA") system, etc.) of an electric power system, an email message, a text message, etc. Notification subsystem 540 may generate a notification upon detection by digital data degradation detection subsystem 528 of a degraded communication channel between IED 542 and merging unit 502.

Figure 6:
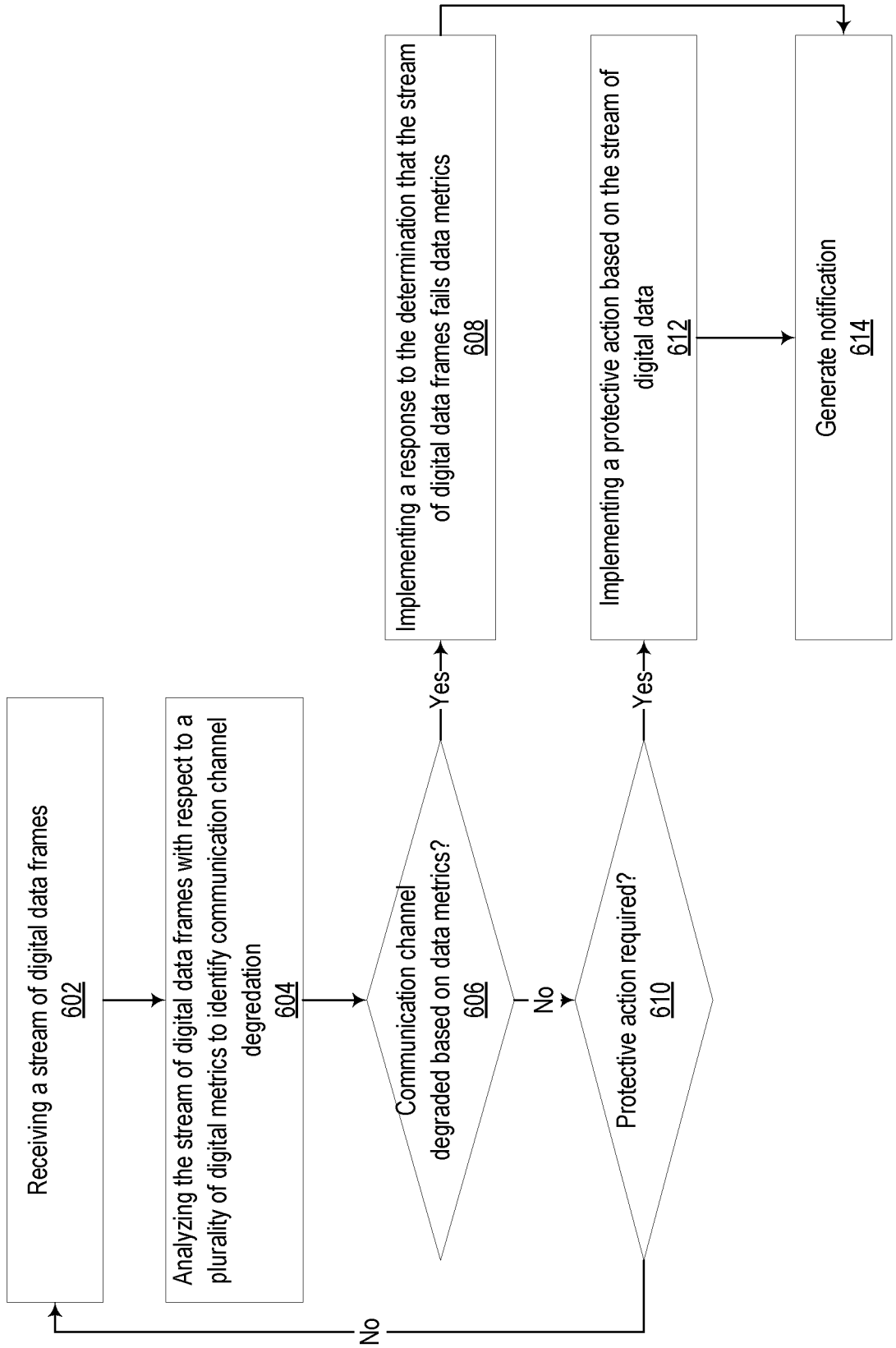
FIG. 6 illustrates a flow chart of a method for monitoring real-time digital data degradation consistent with embodiments of the present disclosure.

FIG. 6 illustrates a flow chart of a method 600 for monitoring real-time digital data degradation consistent with embodiments of the present disclosure. At 602, a device may receive a stream of digital data frames. In one embodiment, the receiving device may comprise a relay in an electric power system that receives a stream of data received from a merging unit. In another embodiment, the receiving device may comprise a merging unit that receives a stream of data from a relay in an electric power system. In still other embodiments, method 600 may be adapted for use by a variety of devices that communicate using digital networks.

At 604, the stream of digital data frames may be analyzed with respect to a plurality of digital metrics to identify communication channel degradation. In one specific embodiment, the metrics may include inputs 302 illustrated in FIG. 3. In another embodiment, the metrics may include inputs 402 illustrated in FIG. 4. The metrics comprise digital metrics determined by the receiving device.

At 606, method 600 may determine whether the communication channel is degraded based on the data metrics. Various embodiments may implement different criteria for satisfying the data metrics. For example, in system 300 illustrated in FIG. 3, an error associated with any of the inputs may cause the output of OR gate 304 to assert, but an error signal is not generated until counter 306 detects exceeds a threshold number of consecutive frames with an error. Similarly, in system 400 illustrated in FIG. 4, a threshold number of frames with an error is necessary to trigger an error output. The thresholds for triggering an error output may be adjusted in various embodiments. Further, the inputs may be grouped differently, and more or fewer inputs may be used.

If the data metrics indicate that the communication channel is not degraded at 606, method 600 may determine whether to implement a protective action using the data. If a protective action is required at 610, the protective action may be implemented at 612. Where method 600 is implemented by a relay in an electric power system, the protective action may include, for example, opening a breaker to interrupt a flow of electric current.

On the other hand, if the data metrics indicate that the communication channel is degraded at 606, method 600 may implement a response at 608. In one embodiment, the response implemented at 608 may include selectively restraining a protective action. Such a response may ensure that protective actions are not implemented based on data that may be unreliable. In another embodiment, the response may include rerouting communication to another device to avoid a degraded communication channel.

Method 600 may generate a notification at 614 if a response is implemented because the stream of digital data frames fails to satisfy the data metrics or if a protective action is implemented based on the stream of digital data. In one specific embodiment, a notification may be generated by notification subsystem 540 illustrated in FIG. 5.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. An intelligent electronic device (IED) in an electric power system to monitor real-time digital data for degradation, wherein the IED monitors, automates and protects the electrical power system, the IED comprising:
an interface to receive a stream of digital data from a merging unit in the electric power system via a physical medium,
wherein the merging unit samples or measures analog voltage and current measurements at a location in the electrical power system, digitizes the voltage and current measurements and transmits the digitized voltage and current measurements as the stream of digital data comprising a plurality of data frames;
a digital data degradation detection subsystem to:
analyze a plurality of digital metrics associated with the plurality of data frames;
make a determination regarding degradation of a communication channel based on whether:
a subset of the plurality of data frames satisfies the plurality of digital metrics, indicating that the communication channel is not degraded, and
the subset of the plurality of data frames fails at least one of the plurality of digital metrics, indicating that the communication channel is degraded; and
implement a response based on determination that the communication channel is degraded by selectively restraining a protective action;
a fault detection subsystem to:
analyze the digitized voltage and current measurements received from the merging unit based on whether the communication channel is degraded; and
based on the analyzed digitized voltage and current measurements, identify a fault by using various types of conditions;
a protective action subsystem to execute the protective action based on the identification of the fault by the fault detection subsystem if the communication channel is not degraded;
wherein the protective action selectively disconnects a portion of the electric power system.

2. The IED of claim 1, wherein the digital data degradation detection subsystem is configured to determine that a count of consecutive frames that fail at least one of the plurality of digital metrics exceeds a limit.

3. The IED of claim 2, wherein the digital data degradation detection subsystem is further configured to reset the count of consecutive frames that fail at least one of the plurality of digital metrics in response to successful receipt of a frame.

4. The IED of claim 1, wherein the digital data degradation detection subsystem is configured to maintain a signal in response to the determination regarding degradation of a communication channel until a reset command is asserted.

5. The IED of claim 1, wherein the digital data degradation detection subsystem is configured to analyze each data frame with respect to each of the plurality of digital metrics.

6. The IED of claim 1, wherein the response to the determination comprises selectively rerouting the stream of digital data.

7. The IED of claim 1, wherein the plurality of digital metrics comprises at least three of an identification failure error, an invalid data error, a merging unit error, a channel delay exceeded error, a stream loss error, and a receive error.

8. A method of monitoring real-time digital data for degradation using an intelligent electronic device (IED) in an electric power system, wherein the IED monitors, automates and protects the electric al power system, the method comprising:
receiving, using an interface of the IED in the electric power system, a stream of digital data from a merging unit in the electric power system via a physical medium, wherein the merging unit samples or measures analog voltage and current measurements at a location in the electrical power system, digitizes the voltage and current measurements and transmits the digitized voltage and current measurements as the stream of digital data comprising a plurality of data frames;
analyzing, using a digital data degradation detection subsystem of the IED in the electric power system, a plurality of digital metrics associated with the plurality of data frames;
making a determination, using the digital data degradation detection subsystem of the IED in the electric power system, regarding degradation of a communication channel based on whether:
a subset of the plurality of data frames satisfies the plurality of digital metrics, indicating that the communication channel is not degraded, and
the subset of the plurality of data frames fails at least one of the plurality of digital metrics, indicating that the communication channel is degraded;
implementing, using the digital data degradation detection subsystem of the IED in the electric power system, a response based on determination that the communication channel is degraded by selectively restraining a protective action;

analyzing, using a fault detection system of the IED in the electric power system, the digitized voltage and current measurements received from the merging unit based on whether the communication channel is degraded; and based on the analyzed digitized voltage and current measurements, identifying, using the fault detection system of the IED in the electric power system, a fault by using various types of conditions;

executing, using a protective action subsystem of the IED in the electric power system, the protective action based on the identification of the fault by the fault detection subsystem if the communication channel is not degraded;

wherein the protective action selectively disconnects a portion of the electric power system.

9. The method of claim 8, further comprising determining that a count of consecutive frames that fail at least one of the plurality of digital metrics exceeds a limit.

10. The method of claim 9, further comprising resetting the count of consecutive frames that fail at least one of the plurality of digital metrics in response to successful receipt of a frame.

11. The method of claim 8, further comprising maintaining a signal in response to the determination until a reset command is asserted.

12. The method of claim 8, wherein each frame in the stream of digital data is analyzed with respect to each of the plurality of digital metrics.

13. The method of claim 8, wherein the response to the determination comprises selectively rerouting the stream of digital data.

14. The method of claim 8, further comprising providing, using a notification subsystem, a notification in response to the determination.

* * * * *